US009012601B2

(12) United States Patent
Hazen et al.

(10) Patent No.: US 9,012,601 B2
(45) Date of Patent: Apr. 21, 2015

(54) WATERBASED DIMERIZED ROSINS AND THE PROCESS TO MAKE THEM

(71) Applicant: Lawter, Inc., Chicago, IL (US)

(72) Inventors: John Hazen, Maastricht (NL); Ivo Kesselaer, Maastricht (NL)

(73) Assignee: Lawter, Inc., Chicago, IL (US)

( * ) Notice: Subject to any disclaimer, the term of this patent is extended or adjusted under 35 U.S.C. 154(b) by 46 days.

(21) Appl. No.: 13/974,996

(22) Filed: Aug. 23, 2013

(65) Prior Publication Data
US 2013/0345390 A1 Dec. 26, 2013

Related U.S. Application Data

(63) Continuation of application No. 12/674,747, filed as application No. PCT/EP2008/007463 on Sep. 11, 2008, now Pat. No. 8,557,954.

(30) Foreign Application Priority Data

Sep. 20, 2007 (EP) .................................... 07075826

(51) Int. Cl.
C09F 1/02 (2006.01)
C09F 1/04 (2006.01)
C08L 93/04 (2006.01)
C09D 11/08 (2006.01)
C09J 193/04 (2006.01)

(52) U.S. Cl.
CPC . C09F 1/04 (2013.01); C08L 93/04 (2013.01); C09D 11/08 (2013.01); C09J 193/04 (2013.01)

(58) Field of Classification Search
CPC ....................................................... C08L 93/04
USPC ........................................................ 530/211
See application file for complete search history.

(56) References Cited

U.S. PATENT DOCUMENTS

| 1,975,211 | A |   | 10/1934 | Johnston |
| 2,011,673 | A |   | 8/1935  | Binapfi |
| 2,288,659 | A |   | 7/1942  | Tyler |
| 2,302,632 | A |   | 11/1942 | Humphrey |
| 2,307,641 | A | * | 1/1943  | Rummelsburg ............... 530/211 |
| 2,328,681 | A |   | 9/1943  | Rummelsburg |
| 2,329,566 | A |   | 9/1943  | Tyler |
| 2,340,696 | A |   | 2/1944  | Rummelsburg |
| 2,341,239 | A |   | 2/1944  | Percy |
| 2,375,618 | A |   | 5/1945  | Bried |
| 2,419,185 | A |   | 4/1947  | Braidwood |
| 3,891,612 | A |   | 6/1975  | Parkin et al. |
| 3,954,690 | A |   | 5/1976  | Hesse et al. |
| 4,071,375 | A |   | 1/1978  | Ishibe et al. |
| 4,157,982 | A |   | 6/1979  | Clemons et al. |
| 4,199,369 | A |   | 4/1980  | Hughes et al. |
| 4,263,182 | A |   | 4/1981  | Aldrich |
| 4,339,377 | A |   | 7/1982  | Hollis |
| 4,374,673 | A | * | 2/1983  | Aldrich ....................... 106/215.2 |
| 4,414,146 | A |   | 11/1983 | Olechowski et al. |
| 4,536,333 | A |   | 8/1985  | Olechowski |
| 4,565,546 | A | * | 1/1986  | Ohzeki et al. ................... 44/311 |
| 5,021,548 | A | * | 6/1991  | Minn ............................ 530/216 |
| 5,175,250 | A |   | 12/1992 | Hazen |
| 6,165,320 | A |   | 12/2000 | Bates et al. |
| 6,369,119 | B1 |  | 4/2002  | Roberts et al. |
| 8,557,954 | B2 | * | 10/2013 | Hazen et al. ................... 530/211 |
| 2002/0023571 | A1 | * | 2/2002 | Rathschlag et al. .......... 106/415 |
| 2003/0229178 | A1 |   | 12/2003 | Locko et al. |
| 2004/0082714 | A1 | * | 4/2004 | Miyamoto et al. ............ 524/700 |
| 2004/0225076 | A1 |   | 11/2004 | Martz et al. |
| 2005/0054801 | A1 |   | 3/2005  | Locko et al. |
| 2005/0203228 | A1 |   | 9/2005  | Aarts et al. |
| 2007/0141503 | A1 |   | 6/2007  | Matsuoka et al. |
| 2007/0254985 | A1 |   | 11/2007 | Maas et al. |
| 2008/0000389 | A1 | * | 1/2008 | Locko et al. ............. 106/287.28 |

FOREIGN PATENT DOCUMENTS

| CN | 1172839 | 2/1998 |
| CN | 1628159 | 6/2005 |
| CN | 1668659 | 9/2005 |
| CN | 1856557 | 11/2006 |
| GB | 0 337 733 | 10/1930 |
| GB | 1 474 441 | 5/1977 |
| JP | 10-001641 | 1/1998 |
| JP | 2002-003793 | 1/2002 |
| JP | 2006-037036 | 2/2006 |
| JP | 2007-056131 | 3/2007 |
| JP | 2007-504325 | 3/2007 |
| TW | 342347 | 10/1998 |
| WO | WO-97/28311 | 8/1997 |
| WO | WO-03/042308 | 5/2003 |
| WO | WO-2005/023948 | 3/2005 |

OTHER PUBLICATIONS

European Communication issued in European Patent Application No. 08802024.3 dated Sep. 9, 2010 (4 pages).
Examination Report issued in Australian Patent Application No. 2008300927 dated Mar. 31, 2011 (3 pages).
Examiner's First Report issued in Australian Patent Application No. 2008300927 dated Jan. 31, 2011 (5 pages).
Final Office Action issued in U.S. Appl. No. 12/674,747 mailed Feb. 27, 2013 (9 pages).
First Office Action issued in Chinese Patent Application No. 200880170899.X dated May 18, 2012 (6 pages).
International Preliminary Report on Patentability issued in PCT/EP2008/007463 dated Mar. 24, 2010 (5 pages).
International Search Report and Written Opinion issued in PCT/EP2008/007463 mailed Jan. 22, 2009 (5 pages).
Non-Final Office Action issued in U.S. Appl. No. 12/674,747 mailed Nov. 23, 2012.
Notice of Allowance issued in U.S. Appl. No. 12/674,747 mailed Jun. 12, 2013 (10 pages).
Office Action issued in Canadian Patent Application No. 2,700,043 dated Mar. 30, 2012 (2 pages).
Office Action issued in Canadian Patent Application No. 2700043 dated Sep. 27, 2011 (2 pages).

(Continued)

Primary Examiner — Liam J Heincer
(74) Attorney, Agent, or Firm — Foley & Lardner, LLP

(57) ABSTRACT

The present invention relates to a method to prepare dimerized rosins dispersible in water in presence of extremely low level of dimerization acid catalyst. The present invention relates also to its use as a tackifier resin, solid or in water, and ink resin, and an adhesive composition and ink composition comprising the rosin resin.

20 Claims, No Drawings

(56) References Cited

OTHER PUBLICATIONS

Office Action received in European Application No. 08 802 024.3 dated Aug. 29, 2012 (4 pages).

Office Action with Search Report received for Taiwan Application No. 097133645 dated Sep. 28, 2012 (8 pages)—English translation included.

Search Report received for European Patent Application No. 12184851.9 dated Feb. 14, 2013 (6 pages)—with English Translation.

Second Office Action issued in Chinese Patent Application No. 200880107899.X mailed Mar. 4, 2013 (10 pages).

Stauffer, Don, "Distillations: Why is Rosin Polymerized," Forest Chemicals Review, (Mar./Apr. 2002) (3 pages).

Zinkel, Duane F. et al., "Naval Stores: Production-Chemistry-Utilization," Pulp Chemicals Association, pp. 288, 585, and 704 (4 pages).

Office Action received in Japanese Patent Application No. 2010-525235 mailed Aug. 27, 2013—English Translation Only (2 pages).

Office Action issued in European Patent Application No. 12184851.9-1306 dated Aug. 20, 2013 (5 pages).

Notice of Rejection received in Japanese Patent Application No. 2010-525235 mailed Aug. 26, 2014, 1 page—English translation only.

Third Office Action received in Chinese Patent Application No. 200880107899.X issued Jul. 1, 2014, 13 pages with English translation.

* cited by examiner

WATERBASED DIMERIZED ROSINS AND THE PROCESS TO MAKE THEM

CROSS-REFERENCE TO RELATED APPLICATIONS

This is a continuation of U.S. patent application Ser. No. 12/674,747, filed on Dec. 7, 2010, which was a national phase entry application of PCT Application PCT/EP2008/007463, filed on Sep. 11, 2008, which in turn claimed the benefit of European Patent Application No. EP07075826.3, filed Sep. 20, 2007, the contents of all being hereby incorporated by reference.

DISCRIPTION

The present invention relates to a method to prepare dimerized rosins dispersible in water in presence of extremely low level of dimerization acid catalyst. The present invention relates also to its use as a tackifier resin, solid or in water, and ink resin, and an adhesive composition and ink composition comprising the rosin resin.

Many methods for the dimerization of rosin have been published. Previous methods describe the use of strong inorganic acids, such as sulfuric acid as the catalyst, U.S. Pat. Nos. 2,136,525, 2,108,982, 2,307,641, 2,328,681, 2,515,218, 2,251,806, 2,532,120 and 4,105,462.

Alternative methods have been described using sulfonated polymers, U.S. Pat. No. 4,414,146, or a halogenated methanesulfonic acid, U.S. Pat. Nos. 4,339,377 and 4,172,070.

Further alternative methods describe the use of formic acid as the catalyst in U.S. Pat. Nos. 2,375,618, 2,492,146, 4,536,333.

The prior art uses processes including a final washing and catalyst removal step adding to the process complexity and cost.

It is an object of the present invention to provide a process that utilizes a catalyst that can be used at extremely low level and/or a catalyst that aids the subsequent product application thereby eliminating the need of a costly washing and catalyst removal step.

The present invention solves the above identified drawbacks by the use of a carboxylated sulfonic acids as catalyst to produce dimerized rosin. The process eliminates the need of catalyst removal by the high activity of the catalyst of the invention.

The present invention relates also to an adhesive composition comprising a dimerized rosin tackifier made according to the present method.

The present invention relates further to resins for ink application comprising the dimerized rosin as building block.

The present invention relates also to an ink composition comprising an ink resin based on the dimerized rosin.

The method of the invention to produce dimerized rosin is based on carboxylated sulfonic acids as catalyst. In one embodiment the carboxylated sulfonic acid derivatives like e.g. sulfosuccinic acid, 5-sulfosalicylic acid or 4-sulfophthalic acid are used as catalyst at 0.1 to 1 weight percent on rosin. In the preferred method 4-sulfosalicylic acid is used as catalyst. The catalyst can be left in the final product or optionally neutralized with alkali such as potassium hydroxide or amines.

The method of the invention to produce dimerized rosin, for subsequent application in water based dispersions such as water based tackifiers, is based on sulphonated surfactants as catalyst.

Production of water based dispersions such as water based tackifiers does require surfactants to aid the emulsification process and stabilize the final dispersion. Sulfonated surfactants are well known surfactants and widely used in many applications. In the embodiment process sulfonated surfactant is used as catalyst to produce dimerized rosin. The catalyst does not require a separation step and can be used at higher level of 1 to 5 weight percent on rosin, typical for the surfactant level in formulations to prepare water based tackifiers. In the subsequent emulsification process only alkali addition such as potassium hydroxide or amine is needed to produce a water based tackifier dispersion. The sulphonate surfactant fulfills a dual role. First as rosin dimerization catalyst then after a subsequent neutralization to form as emulsifier to prepare water based tackifier.

In the preferred embodiment of the present method dodecylbenzene sulfonic acid is used at about 3 weight percent. The process makes about 30% dimerized rosin. After neutralization with triethanol amine the subsequent tackifier dispersion is prepared.

EXAMPLES

Example 1

After the addition of 1000 g Chinese gum rosin and 20 g 4-sulfophthalic acid at 135° C. in a glass reactor, the content is stirred and kept for 4 hours. Then the mixture is heated to 160° C. and kept for another 4 hours.
Analysis: softening point: 92° C. (R&B);
acid value: 150 mg KOH/g;
colour (toluene, 50%): Gardner 7;
dimerized rosin (GPC; RI detector): 41%.

Example 2

After the addition of 1000 g Chinese gum and 38 g dodecylbenzenesulfonic acid at 140° C. in a glass reactor, the content is stirred and kept for 4 hours.
Analysis: softening point: 84° C. (R&B);
acid value: 152 mg KOH/g;
colour (toluene, 50%):Gardner 8;
dimerized rosin (GPC; RI detector): 29%.

Example 3

The rosin resin of example 2, 1000 g, is molten at 110° C. in a steel beaker. While stirring, triethanolamine 25 g, is added. While stirring, water (60° C.) is added in 15 minutes time. The final dispersion is cooled.
Analysis: solids 52%;
viscosity 240 mPas;
particle size (mean): 0.28 µM;
pH: 7.5.

Comparative Examples

Experiment using p-TSA (equimolar amount to 38 g dodecylbenzenesulfonate of example 2).

Example 4

After the addition of 1000 g Tall oil rosin (TOR) and 20 g p-TSA at 135° C. in a glass reactor, the content is stirred and kept for 4 hours.

The temperature is increased to 150° C. and kept for another hour. 13 g KOH solution in water (50%) is added.

Analysis: softening point: 83° C. (R&B);
acid value: 146 mg KOH/g;
dimerized rosin (GPC; RI detector): 22%.

Example 5

The rosin resin of example 4, 1000 g, is molten at 110° C. in a steel beaker. While stirring 1000 g water at 60° C. is added in 15 minutes time. The content is cooled.

Analysis: No sign of emulsification nor inversion point. Two phases wherein one being the solid rosin resin and the other water.

What is claimed is:

1. A method comprising producing a dimerized rosin in the presence of a catalyst comprising a carboxylated sulfonic acid comprising 4-sulfophthalic acid.

2. The method of claim 1, further comprising neutralizing the dimerized rosin with an alkali salt or an organic amine.

3. The method of claim 1, further comprising neutralizing the dimerized rosin with potassium hydroxide.

4. The method of claim 1, further comprising dispersing the dimerized rosin in water.

5. The method of claim 4, wherein the dispersing is conducted in the presence of a surfactant.

6. The method of claim 1, wherein the producing comprises contacting a rosin with the catalyst at a temperature from 135° C. to 160° C.

7. The method of claim 1, wherein the producing comprises contacting a rosin with the catalyst at a temperature from 135° C. to 160° C. to form a product comprising about 41% of the dimerized rosin.

8. The method of claim 1, wherein the carboxylated sulfonic acid is present at a level from 0.1 to 1 weight percent on rosin.

9. The method of claim 1, wherein the producing comprises contacting a rosin with from 0.1 to 1 wt % of the catalyst at a temperature from 135° C. to 160° C., neutralizing the dimerized rosin with an alkali salt or an organic amine to form a product comprising about 41% of the neutralized dimerized rosin, the product comprising the alkali salt, organic amine, or a salt of the organic amine.

10. The dimerized rosin produced by the method of claim 1, wherein the catalyst, or a residue thereof, remains in the dimerized rosin.

11. A tackifier resin comprising the dimerized rosin of claim 10.

12. An ink comprising the dimerized rosin of claim 10.

13. An adhesive comprising the dimerized rosin of claim 10.

14. The dimerized rosin produced by the method of claim 2, the dimerized rosin comprising the alkali salt, organic amine, or a salt of the organic amine, wherein the catalyst, or a residue thereof, remains in the dimerized rosin.

15. A tackifier resin comprising the dimerized rosin of claim 14.

16. An ink comprising the dimerized rosin of claim 14.

17. An adhesive comprising the dimerized rosin of claim 14.

18. The product produced by the method of claim 9, wherein the catalyst, or a residue thereof, remains in the dimerized rosin.

19. The method of claim 1, wherein the producing comprises contacting a rosin with the catalyst at a temperature from 135° C. to 160° C.

20. A method comprising producing a dimerized rosin in the presence of a catalyst comprising a carboxylated sulfonic acid, wherein the producing comprises contacting a rosin with from 0.1 to 1 wt % of the catalyst at a temperature from 135° C. to 160° C., neutralizing the dimerized rosin with an alkali salt or an organic amine to form a product comprising about 41% of the neutralized dimerized rosin, the product comprising the alkali salt, organic amine, or a salt of the organic amine.

* * * * *